(12) United States Patent
Goñi Usabiaga

(10) Patent No.: US 6,273,121 B1
(45) Date of Patent: Aug. 14, 2001

(54) VALVE SEAT SELF CLEANING DEVICE FOR ALUMINA PRODUCTION PLANTS

(75) Inventor: Juan José Goñi Usabiaga, Beasain (ES)

(73) Assignee: Ampo, S. Coop., Idiazabal (ES)

( * ) Notice: Subject to any disclaimer, the term of this patent is extended or adjusted under 35 U.S.C. 154(b) by 0 days.

(21) Appl. No.: 09/463,126

(22) PCT Filed: May 26, 1998

(86) PCT No.: PCT/ES98/00146

§ 371 Date: Jan. 19, 2000

§ 102(e) Date: Jan. 19, 2000

(87) PCT Pub. No.: WO99/61829

PCT Pub. Date: Dec. 2, 1999

(51) Int. Cl.$^7$ .................................................. F16K 29/00
(52) U.S. Cl. ........................................ 137/243.6; 137/331
(58) Field of Search ............................ 137/243, 243.1, 137/243.6, 331, 330

(56) References Cited

U.S. PATENT DOCUMENTS

| 1,228,582 | * | 6/1917 | Mowry | 137/243.6 X |
|---|---|---|---|---|
| 2,984,127 | | 5/1961 | Schwenk . | |
| 3,995,966 | | 12/1976 | Blancha . | |
| 4,346,728 | * | 8/1982 | Sulzer | 137/243.6 |
| 4,460,009 | * | 7/1984 | Nanci et al. | 137/243.6 |
| 4,465,091 | * | 8/1984 | Keller | 137/243.6 |
| 6,119,716 | * | 9/2000 | Wright | 137/243.6 X |

FOREIGN PATENT DOCUMENTS 6193762    7/1994   (JP) .

OTHER PUBLICATIONS

English Abstract of JP–06193762 A.

* cited by examiner

*Primary Examiner*—Kevin Lee
(74) *Attorney, Agent, or Firm*—Ladas & Parry

(57) ABSTRACT

This valve is applicable in conduction of bauxite in pipes and is meant to allow the self-cleaning of the valve with the aid of a locking cap which connects the drive crown and the valve shaft, causing the rotation of said crown to be transmitted to the valve shaft, which as it rotates rubs on the valve seats, thus removing the depositions.

4 Claims, 3 Drawing Sheets

A-A

A-A

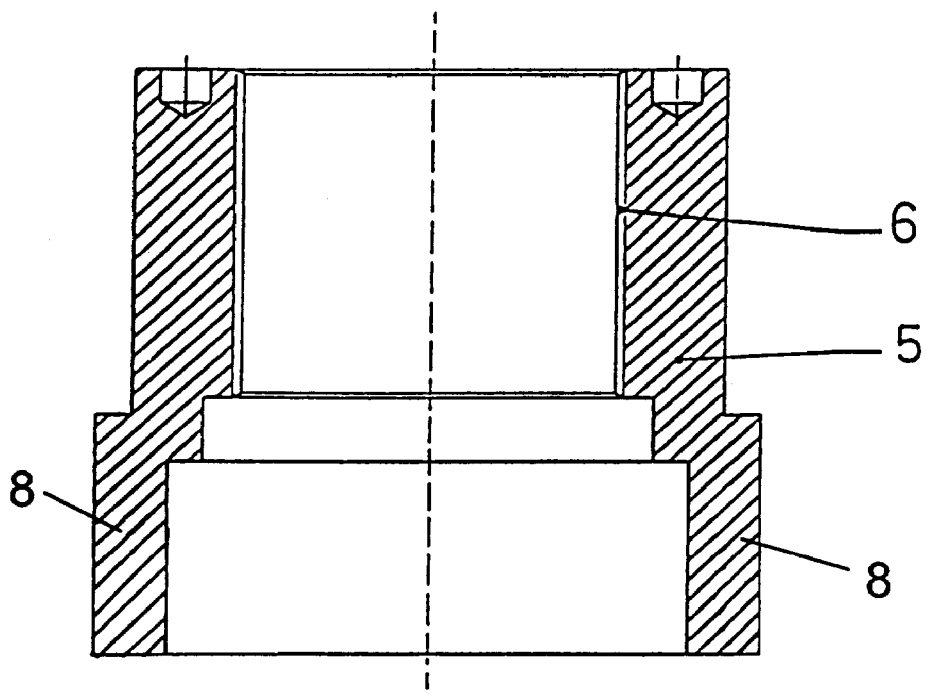
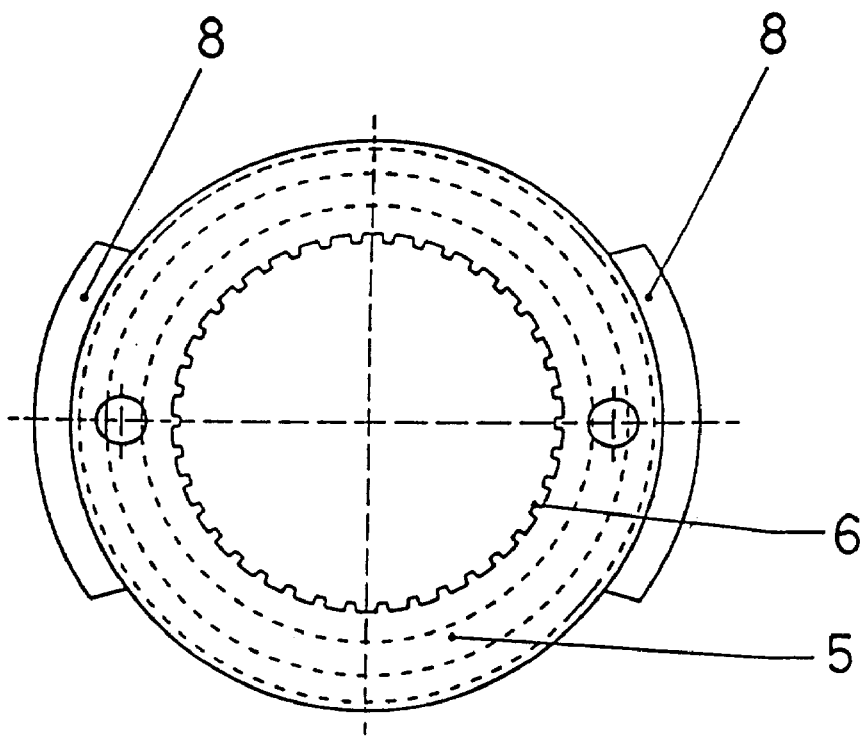
FIG. 3A
FIG. 3B

VALVE SEAT SELF CLEANING DEVICE FOR ALUMINA PRODUCTION PLANTS

OBJECT OF THE INVENTION

The present invention relates to a device applicable to valves in alumina obtaining installations with the object of providing self-cleaning of bauxite depositions inside the valve body, by rotation and scraping of seats inside the valve body.

BACKGROUND OF THE INVENTION

As is known, aluminum is obtained by electrolysis from bauxite, with the bauxite passing through several phases or process stages before alumina, and afterwards aluminum may be obtained.

At installations where this type of process is carried out, over time bauxite adheres to valve seats, and although occasionally this problem may result in the bauxite acting as a sealant between the valve disc or ring and the seat, the general results in that the disc cannot rest properly on the valve seat.

These depositions inside the valve must be removed manually.

This type of valves comprises a rod or shaft with a disc or seal solidly joined to it which is housed inside the valve body, so that these elements make up the valve itself.

The valve is driven by means of an input shaft which, through a bevel gear, drives a crown provided with recesses in which fit battlement-shaped projections provided in the spindle nut, so that the rotation of the crown is transmitted to the spindle nut, which in turn causes the valve shaft to ascend or descend, and therefore causes the coupling or decoupling of the valve disc or ring on the valve body seats.

SUMMARY OF THE INVENTION

The valve for alumina obtaining installations disclosed has been conceived to solve the above described problem, by incorporating a device which allows internal self-cleaning of the same, and more specifically elimination of bauxite depositions on the seats, in order to ensure a perfect contact between the disc and packing rings of the valve body.

To this end, a device is provided which causes rotation of the ring or disc about its shaft, so that said rotation causes scraping of the ring on the seats inside the valve body. The friction from the scraping removes the adhered depositions.

The device consists of a locking cap which is coupled to the top end of the valve shaft by means of an inner toothing, and is additionally inserted by means of flaps in recesses of the crown which drives the spindle nut, thus relating the valve shaft to the crown so that they will both move simultaneously.

Thus, rotation of the input shaft will cause, through the bevel gear, a rotation of the crown, and in turn the latter will carry in its motion the spindle nut and the locking cap. The locking cap will carry the valve shaft in its motion, causing a rotation of the valve disc or ring inside the valve body, and with it scraping of the seats.

In order to resume normal operation of the alumina valve, the locking cap is withdrawn, decoupling motion of the crown and the shaft so that rotation of the input or driving shaft in either direction causes rotation of the crown and therefore the spindle nut, and the rising or lowering of the valve shaft.

BRIEF DESCRIPTION OF THE DRAWINGS

Further characteristics and advantages of the present invention will more fully appear from the accompanying set of drawings where, for the purpose of illustration only and not intended as a definition of the limits of the invention, the following is shown:

FIG. 3A is a top plan view of the locking cap; FIG. 3B is a sectional view of the locking cap.

PREFERRED EMBODIMENT OF THE INVENTION

Figure 1A:
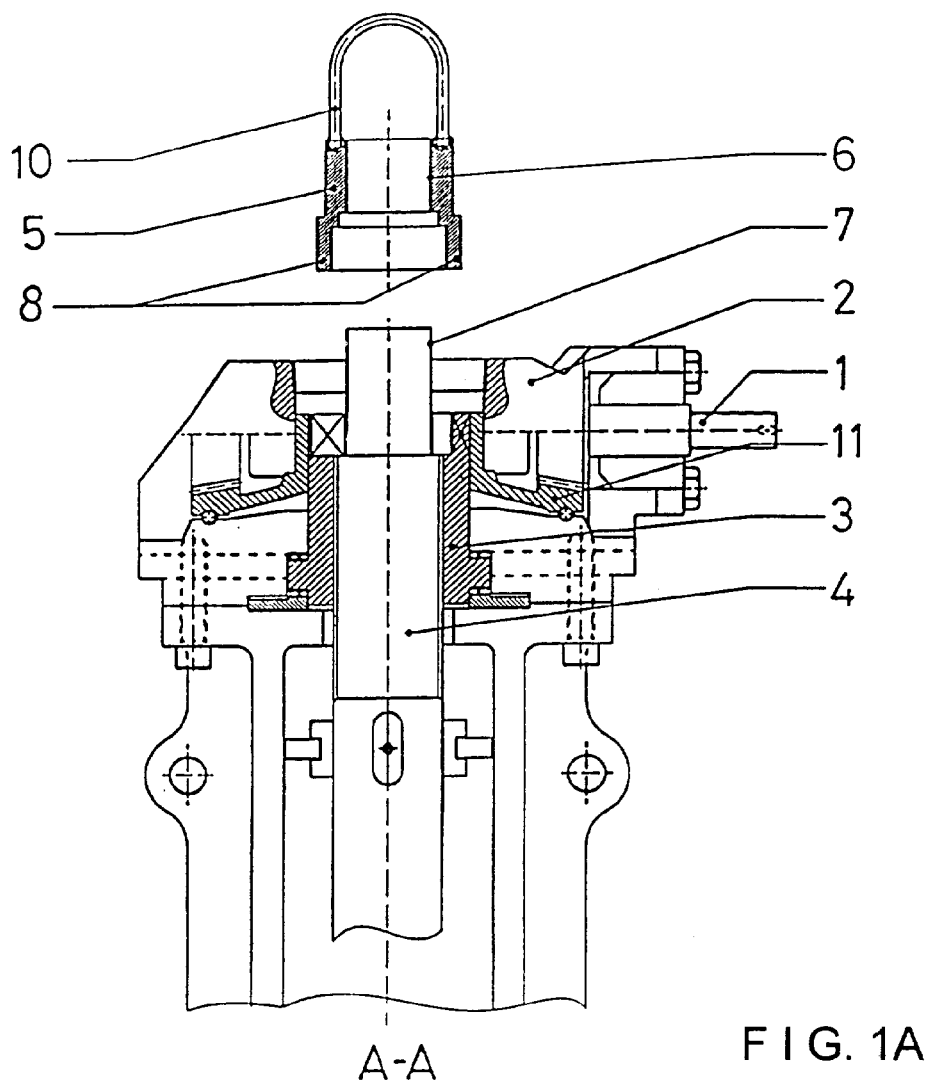
FIG. 1A is a plan view of the top of the valve shaft or rod in normal operation, with the locking cap unattached.
Figure 1B:
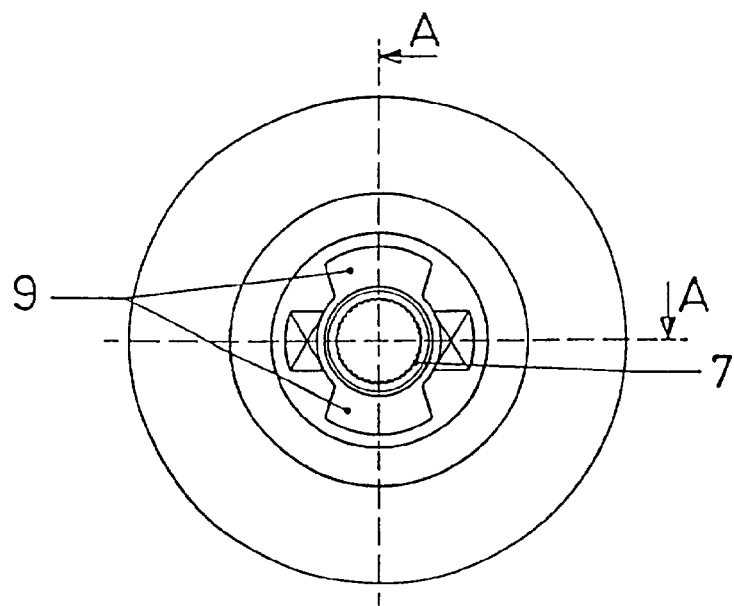
FIG. 1B is elevation view of section A—A; attached.
Figure 2A:
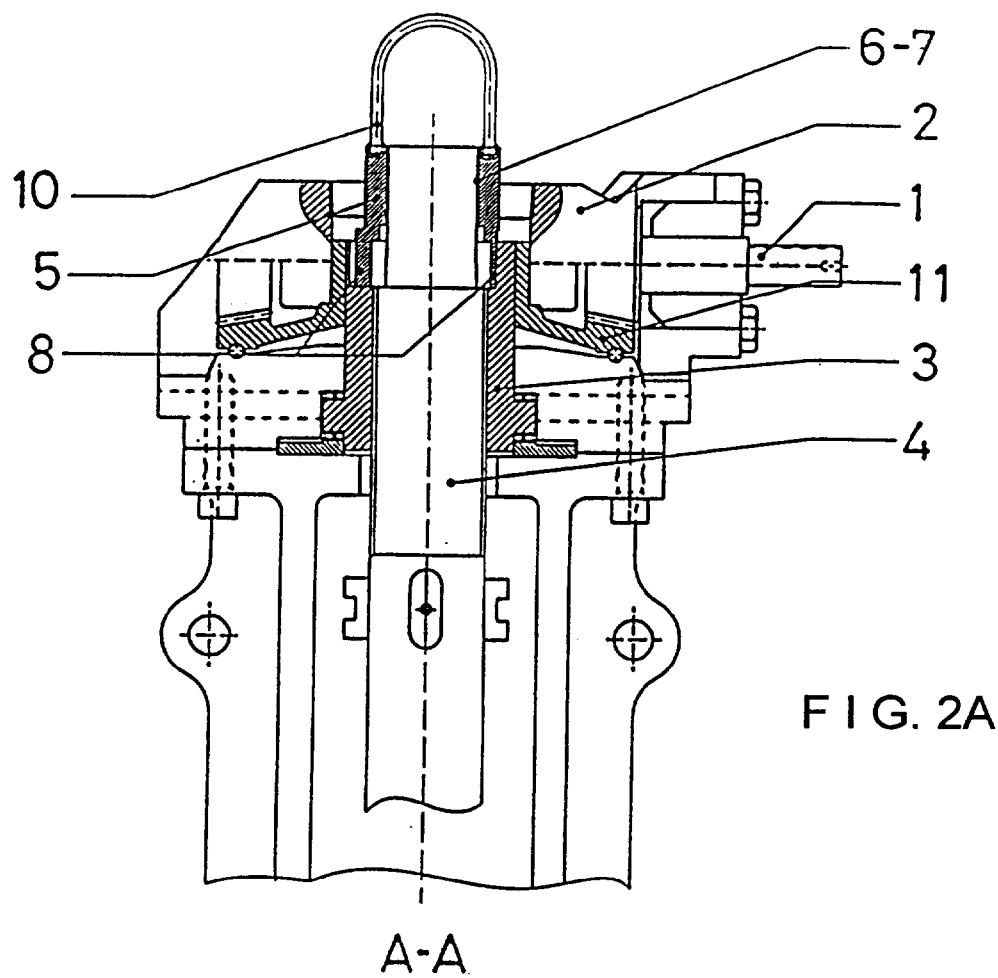
FIGS. 2A and 2B correspond to FIGS. 1A and 1B, but show the locking cap attached in order to perform self-cleaning of the valve unit.

FIGS. 1 and 2 show the valve unit partially, showing only the valve shaft (4) inside the top part of the valve body. The shaft (4) acts as a spindle as it is inside spindle nut (3), which rotates due to the action of drive shaft (1) which transmits its motion to nut (3) through bevel gear (2) and crown (11), making said valve shaft (4) ascend or descend. For this, the spindle nut is provided with upper projections in the shape of battlements (12) which couple to corresponding recesses made in crown (11) so that, in its rotation, the crown carries spindle nut (3).

The top end of valve shaft (4) is accessible from the top and is provided in its side wall with a toothing (7) which is visible in FIG. 1B.

The device employed to perform self-cleaning of the valve consists of a locking cap (5) which allows to engage crown (11) and valve shaft (4) so that shaft, crown and spindle nut rotate simultaneously. The locking cap, shown in FIG. 3, comprises a cylindrical body with different internal diameters provided with perimetral flaps (8), and internally in its top segment with an inner toothing (6) complementary to toothing (7) of valve shaft (4).

The locking cap (5) can be easily handled by its handle (10), which is screwed to cap (5) on its top area.

Figure 2B:
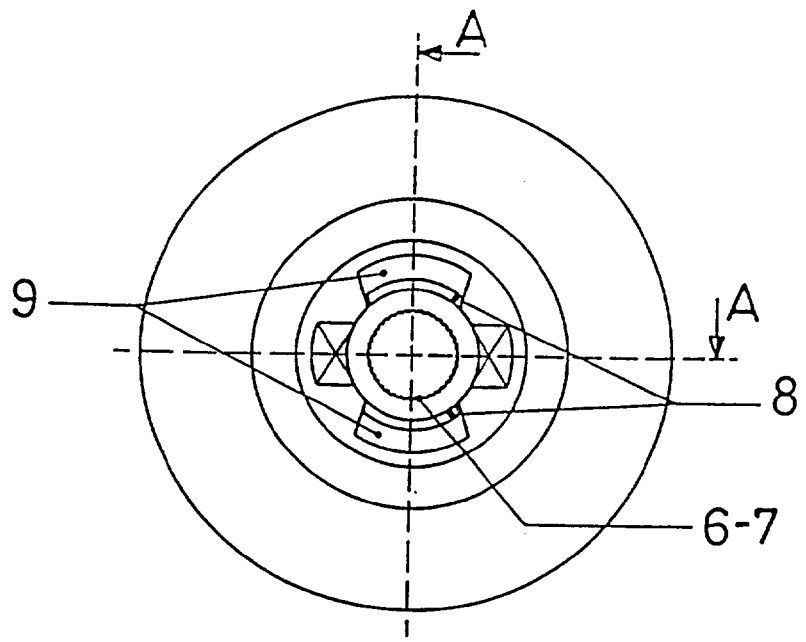

Thus, when self-cleaning of the seat is desired, locking cap (5) is coupled as shown in FIG. 2B, so that perimetral flaps (8) match and are inserted in recesses or key slots (9) provided for this purpose in crown (11). The upper end of the valve shaft is coupled inside locking cap (5), with internal toothing (6) engaging toothing (7), so that rotation of shaft (4) inside locking cap (5) is prevented.

Due to this coupling, crown (11) and valve shaft (4) can only turn in the same direction, so that the action of drive shaft (1) makes the rotation of crown (11), through locking cap (5), carry valve shaft (4) with the entire unit rotating and therefore causing scraping of the ring in the valve seats in order to remove any depositions.

What is claimed is:

1. In an apparatus for processing bauxite into alumina comprising means for coupling and decoupling a valve ring from a valve seat, said means comprising a crown, a valve shaft to which the ring is joined and drive means for rotating the crown and for translating rotational movement of the crown into ascendant or descendant movement of the valve shaft, the improvement wherein the apparatus comprises a locking cap, said locking cap comprising coupling means for coupling the crown and the valve shaft so that rotation of the crown causes rotation of the valve shaft which in turn causes rotation of the ring joined to the valve shaft whereby the ring can scrape bauxite deposits from the valve seat.

2. An apparatus according to claim 1, wherein the valve shaft comprises teeth in a top part thereof and the locking cap has a top segment with an integral perimeter that comprises complementary teeth that engage the teeth in the top part of the valve shaft to prevent rotation between the teeth and the complementary teeth.

3. An apparatus according to claim 2, wherein the crown comprises a plurality of key slots and the coupling means of the locking cap comprises a plurality of perimetral flaps that are insertable into the respective key slots.

4. An apparatus according to claim 3, wherein the locking cap comprises handle means, comprising a handle, for simplifying handling of the locking cap in coupling the crown and the valve shaft.

\* \* \* \* \*